United States Patent [19]

Sibole

[11] Patent Number: 4,968,190
[45] Date of Patent: Nov. 6, 1990

[54] METHOD OF CUTTING THREADS

[76] Inventor: R. Wade Sibole, Four Star Products, Inc., P.O. Box 185, Prince Fredrick, Md. 20678

[21] Appl. No.: 394,717

[22] Filed: Aug. 16, 1989

Related U.S. Application Data

[62] Division of Ser. No. 134,905, Dec. 18, 1987, Pat. No. 4,872,790.

[51] Int. Cl.⁵ .......................... B23G 1/00; B23G 5/00
[52] U.S. Cl. ...................................... 408/1 R; 10/1 B
[58] Field of Search ................. 10/1 R, 1 B, 111, 113, 10/120, 121, 123 R, 123 P, 123 S; 408/1 R, 215, 221, 227; 411/432, 433, 437

[56] References Cited

U.S. PATENT DOCUMENTS

| | | | |
|---|---|---|---|
| 162,983 | 5/1875 | Wells | 408/162 X |
| 1,360,297 | 11/1920 | Jensen et al. | 411/432 |
| 1,589,541 | 6/1926 | Miller | 10/123 R |
| 1,664,023 | 12/1953 | Mugford | 411/433 |
| 1,803,888 | 5/1931 | Basola et al. | 408/187 |
| 1,915,588 | 6/1933 | Arrington | 411/433 |
| 3,078,743 | 2/1963 | Wolfe | 408/187 |
| 4,572,032 | 2/1986 | Kinzler | 408/221 X |

FOREIGN PATENT DOCUMENTS 3145923  6/1983  Fed. Rep. of Germany ...... 411/433

Primary Examiner—E. Michael Combs

[57] ABSTRACT

A method of threading or rethreading a member by the use of a die made up of a plurality of complementary separable interfitting parts held together by a tensional element disposed around the exterior surface thereof which in use are separated from one another under the tension of an abrasing element thereby enabling the die to be passed over the member whereat the separating force is relaxed permitting the parts to re-engage thereon. The die is then turned to effect the cutting of the threads.

1 Claim, 1 Drawing Sheet

U.S. Patent  Nov. 6, 1990  4,968,190
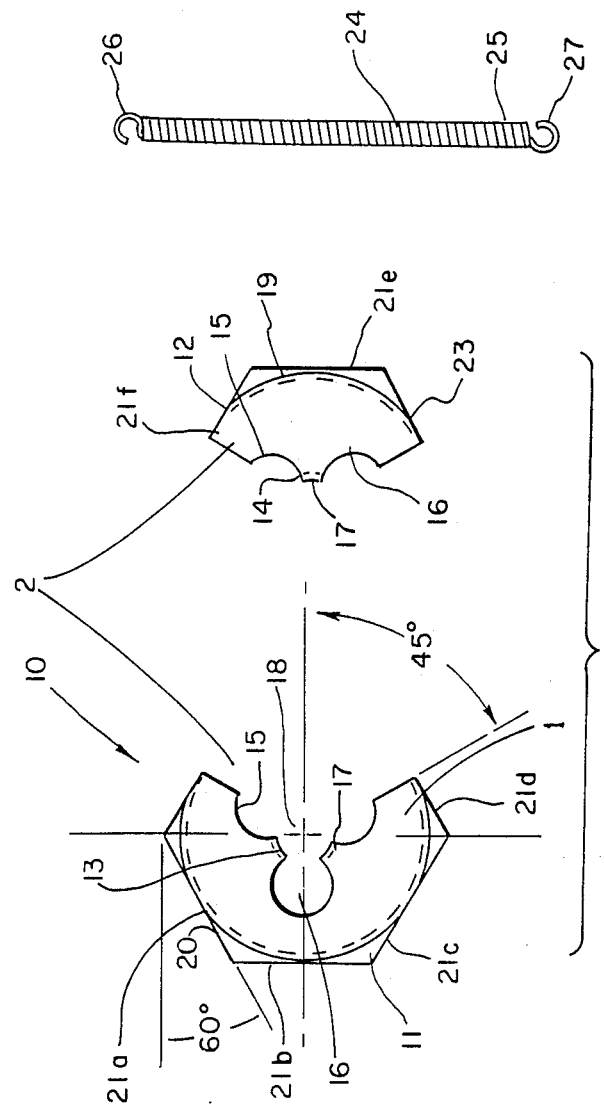
FIG. 3.
FIG. 1
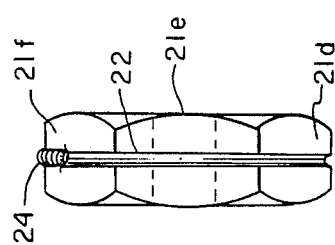
FIG. 2

METHOD OF CUTTING THREADS

CROSS REFERENCE TO RELATED APPLICATION

This application is a divisional application of my copending application Ser. No. 134,905 filed Dec. 18, 1987, and now U.S. Pat. No. No. 4,872,790.

BACKGROUND OF THE INVENTION

The present invention relates to a method for threading or repairing damaged threads on a stud-like member in situ in order to avoid disassembling the device to replace the same. Generally, the prior art suggests overcoming the problem of disassembling the device on which the member is mounted by providing a split die which can be separated to permit the same to be opened to pass over and along the elongated member to be threaded or repaired and then reassembled adjacent the desired area. The die is then turned and advanced to cut the new threads. Dies of this nature are typified by U.S. Pat. Nos. 1,951,581 and 4,572,032.

Additionally, the inventor is aware of prior art, U.S. Pat. Nos. 1,366,884, 1,915,588, 2,377,581, 2,644,023 and 3,038,366 dealing with split nuts which can be separated and re-engaged for placement on a threaded shaft.

SUMMARY OF THE INVENTION

The present invention is directed to a method of threading or repairing threads by using a split die and generally is structurally similar to the afore-mentioned prior art, differing only in the manner in which the same is manufactured, assembled and used.

To this end, the threading is accomplished by using a die that is split into at least two separate interfitting parts having at least one cutting lobe with material receiving recesses on either side thereof which when mated together defines a central opening receiving the elongated member to be threaded or rethreaded therethrough. A wrench or other turning tool is then placed over the outer surface of the die to turn and cut threads therein.

BRIEF DESCRIPTION OF THE DRAWING

FIG. 1 is a front exploded view showing the parts of the die;

FIG. 2 is a side view of the same; and

FIG. 3 is a view showing the peripheral biasing element which maintains the die parts in assembled relationship.

DESCRIPTION OF THE PREFERRED EMBODIMENT

Referring to FIG. 1 of the drawing, the thread cutting die of the present invention is depicted generally by the numeral 10 and is seen to be comprised of two separate complementary interfitting parts 11 and 12 having at least one lobe 13,14 formed on the interior thereof with recesses 15,16 disposed on either side thereof. The uppermost section of the lobes 13,14 have threads 17 cut therein, as shown in dotted outline.

The die 10 is conventional in all respects except for the manner in which it is formed. When the parts 11 and 12 are mated to form the member 10, the spaced lobes and recesses define an annular inner space 18 through which a bolt, a screw or any elongated member can extend. The outer surfaces 19,20 of the parts 11 and 12 define a plurality of contiguous flat, side surfaces 21a-f, which are adapted to be engaged by a wrench or the like for turning the same to form or cut the threads on the member to be threaded. In makeup, and as seen, part 11 comprises about three-quarters of, and part 12, about one-quarter of, the entire die 10.

While two parts such as 11 and 12 are preferred, it is to be understood that the die 10 can be divided into as many parts as desired, and that the size and number of cutting surfaces can be designed as needed.

With reference to the side view of FIG. 2, the die 10 is seen to be provided with a continuous annular recess 22 cut into the sides 21a-f, and shown by the dotted outline 23 in FIG. 1. The recess 22 receives a spring 24 shown in FIG. 3 as an elongated coiled member 25 having securing hooks 26,27 at each end thereof. The spring 24 is wrapped in the recess 22 with the free ends 26,27 connected to one another, with respective portions thereof staked or otherwise secured to the parts 11 and 12.

The spring 24 is tensioned to maintain the parts 11,12 in normal mating engagement while allowing the same to separate from one another in order that the same may be expanded to readily pass over an elongated element to be threaded.

In use, when an element is to be threaded or rethreaded, the die is grasped and the parts 11 and 12 completely separated from one another under the tension of the spring 24 with the opening 18 being moved lengthwise over the element to the area where the threading or rethreading is to be done. At this point, the pulling force is relaxed and the parts under the tension of the spring are re-engaged on the member. A wrench or other turning tool is then positioned on the exterior of the die and turned to cut the thread.

I claim:

1. The method of threading a member comprising the steps of providing a thread cutting die having at least two completely separable parts held together by an annular, resilient tensioned element disposed about the periphery thereof, placing an expanding force on said die parts and said annular element to move said die parts totally out of contact with one another against the tension of said element, moving the separated die parts lengthwise over the member to be threaded to a point where the same is to be threaded, relaxing said expanding force and causing said annular element to move said die parts into re-engagement with one another on the member, turning the die to cut threads thereon, re-expanding said die parts completely out of contact with said member and removing said die parts from said member after the threads have been cut.

* * * * *